United States Patent [19]
Meeks et al.

[11] Patent Number: 5,315,197
[45] Date of Patent: * May 24, 1994

[54] ELECTROMAGNETIC THRUST BEARING USING PASSIVE AND ACTIVE MAGNETS, FOR COUPLING A ROTATABLE MEMBER TO A STATIONARY MEMBER

[75] Inventors: Crawford R. Meeks, Woodland Hills; Patrick T. McMullen, Los Angeles, both of Calif.

[73] Assignee: AVCON - Advance Controls Technology, Inc., Agoura Hills, Calif.

[*] Notice: The portion of the term of this patent subsequent to Oct. 5, 2010 has been disclaimed.

[21] Appl. No.: 106,927

[22] Filed: Aug. 16, 1993

Related U.S. Application Data

[63] Continuation-in-part of Ser. No. 876,586, Apr. 30, 1992, Pat. No. 5,250,865.

[51] Int. Cl.$^5$ ............................................. H02K 7/09
[52] U.S. Cl. ................................................. 310/90.5
[58] Field of Search ....................... 310/90, 90.5, 68 B

[56] References Cited

U.S. PATENT DOCUMENTS

| | | | |
|---|---|---|---|
| 3,890,019 | 6/1975 | Boden et al. | 310/90.5 |
| 3,976,339 | 8/1976 | Sabnis | 310/90.5 |
| 4,037,886 | 7/1977 | Boden et al. | 310/90.5 |
| 4,072,370 | 2/1978 | Wasson | 310/90.5 |
| 4,080,012 | 3/1978 | Boden et al. | 310/90.5 |
| 4,128,280 | 12/1978 | Purtschert | 310/90.5 |
| 4,180,296 | 12/1979 | Habermann | 310/90.5 |
| 4,405,286 | 9/1983 | Studer | 310/90.5 X |
| 4,563,046 | 1/1986 | Shimamoto | 310/74 X |
| 4,583,794 | 4/1986 | Takahara et al. | 310/90.5 |
| 4,597,613 | 7/1986 | Sudo | 310/90.5 |
| 4,626,764 | 12/1986 | Habermann et al. | 310/90.5 X |
| 4,652,780 | 3/1987 | Murakami et al. | 310/90.5 |
| 4,806,835 | 2/1989 | Habermann | 318/607 |
| 4,811,906 | 3/1989 | Prus . | |
| 4,812,694 | 3/1989 | Fremery | 310/90.5 |
| 4,812,757 | 3/1989 | Meins et al. . | |
| 4,839,550 | 6/1989 | Mizuno et al. | 310/90.5 |
| 4,841,184 | 6/1989 | Chen et al. | 310/90.5 |
| 4,866,318 | 9/1989 | Habermann et al. | 310/90.5 |
| 4,866,380 | 9/1989 | Meins et al. . | |
| 4,872,357 | 10/1989 | Vaillant De Guelis et al. . | |
| 4,879,500 | 11/1989 | Kanemitsu | 310/90.5 X |
| 4,885,491 | 12/1989 | Hiyama et al. | 310/90.5 |
| 4,889,039 | 12/1989 | Miller . | |

(List continued on next page.)

FOREIGN PATENT DOCUMENTS 2841256 4/1980 Fed. Rep. of Germany .
59-43220 3/1984 Japan .

Primary Examiner—Emanuel T. Voeltz
Assistant Examiner—E. To
Attorney, Agent, or Firm—Kelly, Bauersfeld & Lowry

[57] ABSTRACT

An electromagnetic thrust bearing couples a rotatable member relative to a stationary member utilizing a combination of controllable electromagnets and a radially polarized permanent magnet, each physically associated with the stationary member. In one embodiment the rotatable member comprises a shaft having a pair of axially spaced apart thrust discs fixed thereto. A pair of solenoids are disposed about the rotatable member between the spaced apart thrust discs in oppositely facing relating to axially-facing sides of the thrust discs. The solenoids are capable of generating a controllable electromagnetic field. An arcuate radially polarized permanent magnet is disposed between the solenoids to generate a constant flux high density magnetic field between a solenoid housing and the thrust discs. In a second embodiment, a pair of solenoids are disposed about the rotatable member in facing relating on opposite sides of a single thrust disc. A radially polarized permanent magnet is disposed between the solenoids radially outwardly from the thrust disc for generating a constant flux high density magnetic field between solenoid housings and the thrust disc. A sensor determines the axial positioning of the rotatable member relative to the stationary member and provides input for controlling the positioning of the thrust disc(s) by varying the magnetic flux generated by the solenoids.

28 Claims, 2 Drawing Sheets

U.S. PATENT DOCUMENTS

| | | |
|---|---|---|
| 4,891,832 | 1/1990 | Ebersberger . |
| 4,894,922 | 1/1990 | Lovelock . |
| 4,895,023 | 1/1990 | Roubinet et al. ............. 310/90.5 X |
| 4,900,962 | 2/1990 | Hockney et al. ................... 310/90.5 |
| 4,908,558 | 3/1990 | Lordo et al. .................... 310/90.5 X |
| 4,910,449 | 3/1990 | Hiyama et al. ............... 310/90.5 X |
| 4,912,387 | 3/1990 | Moulds, III ................... 310/90.5 X |
| 4,918,345 | 4/1990 | Vaillant de Guelis et al. ... 310/90.5 |
| 4,920,290 | 4/1990 | Murakami et al. ................. 310/90.5 |
| 4,928,561 | 5/1990 | Fouche ......................... 310/90.5 X |
| 4,929,158 | 5/1990 | Girault . |
| 4,942,321 | 7/1990 | Kanemitsu ........................ 310/90.5 |
| 4,946,345 | 8/1990 | Watanabe et al. . |
| 4,947,067 | 8/1990 | Habermann et al. .......... 310/90.5 X |
| 4,956,571 | 9/1990 | Gordon et al. ..................... 310/90.5 |
| 4,964,147 | 10/1990 | Laurent et al. . |
| 4,969,803 | 11/1990 | Turanskyj . |
| 4,976,177 | 12/1990 | Fouche ......................... 310/90.5 X |
| 4,982,126 | 1/1991 | Jolivet et al. ......................... 310/90 |
| 4,983,869 | 1/1991 | Vaidya et al. ..................... 310/90.5 |
| 4,988,906 | 1/1991 | Littlefield ........................ 310/90.5 |
| 5,005,297 | 4/1991 | Aehnelt et al. . |
| 5,010,563 | 4/1991 | Laurent et al. ................ 310/90.5 X |
| 5,012,359 | 4/1991 | Kohno et al. . |
| 5,021,697 | 6/1991 | Kralick ............................. 310/90.5 |
| 5,027,280 | 6/1991 | Ando et al. ................... 310/90.5 X |
| 5,072,146 | 12/1991 | New ................................ 310/90.5 |
| 5,111,102 | 5/1992 | Meeks ............................. 310/90.5 |
| 5,250,865 | 10/1993 | Meeks ............................. 310/90.5 |

ELECTROMAGNETIC THRUST BEARING USING PASSIVE AND ACTIVE MAGNETS, FOR COUPLING A ROTATABLE MEMBER TO A STATIONARY MEMBER

RELATED APPLICATION

This is a continuation-in-part of U.S. patent application Ser. No. 07/876,586, filed Apr. 30, 1992 and entitled ELECTROMAGNETIC THRUST BEARING FOR COUPLING A ROTATABLE MEMBER TO A STATIONARY MEMBER, now U.S. Pat. No. 5,250,865, which issued Oct. 5, 1993.

BACKGROUND OF THE INVENTION

This invention relates generally to improvements in magnetic bearing structures. More particularly, the present invention relates to a magnetic thrust bearing which utilizes a combination of controllable electromagnets and constant flux permanent magnets associated with a stationary member, to axially flux couple a rotatable member to the stationary member.

Electromagnetic bearings are highly effective for supporting a body, such as a rotating shaft, which is effectively floated or levitated by magnetic fields. In this way the rotating shaft has no frictional contact with any stationary structure, thereby permitting relatively friction free rotation of the shaft or rotation of a body about the shaft. This arrangement possesses the obvious advantage that there is no mechanical abrasion, which results in reduced mechanical noise and durability not available with other types of bearing structures. Moreover, because of the reduced frictional effects which would otherwise be encountered with conventional bearing structures, it is possible to obtain higher speeds of rotation with electromagnetic bearings.

Magnetic bearings typically require little maintenance and readily lend themselves to operation in hostile environments such as in connection with corrosive fluids where other conventional bearings would be destroyed or rendered inoperable. Further, magnetic bearings are suitable for supporting moving bodies in a vacuum, such as in outer space, or in canned pumps where the pump rotor must be supported without the use of physically contacting bearings.

One of the primary considerations in the development of magnetic bearing structures is to eliminate so-called air gaps. The so-called air gaps form a portion of the magnetic flux pathway of the electromagnets and permanent magnets, and provide a bridge between a supporting structure and a levitated structure. In actuality, some air gaps must be tolerated in order to position a suspended or rotatable body. Thus, air gaps to some extent cannot be avoided, but it is desirable to reduce air gaps to an absolute minimum.

From a pure physics standpoint, an air gap introduces great inefficiency into any type of magnetic structure. An air gap is about 2,000 times less efficient than an iron core medium for transmitting magnetic flux. Thus, in terms of inefficiency, a magnetic bearing structure which has an air gap of 0.1 inch is far more inefficient than a magnetic bearing which has an iron gap of 20 inches.

In addition, it is important to overcome the conductivity constraints of permanent magnets. Essentially, permanent magnets are very poor conductors for a magnetic flux, even though they generate magnetic flux. The most efficient permanent magnets available are the rare earth alloy magnets. Such permanent magnets, however, have a very low magnetic permeability and they behave in much the same manner as air gaps in the magnetic circuit. The low permeability of rare earth alloy magnets requires significant power to drive electromagnetic fields through the permanent magnets, thereby resulting in low electrical efficiencies. Thus, it is undesirable to transmit an electromagnetic field through a permanent magnet.

Early magnetic thrust bearings consisted of two solenoids positioned on each side of a rotatable disc which is an integral part of the supported shaft. Such early designs utilized the electromagnetic solenoid coils to create a magnetic field in the two air gaps between the solenoids and the rotatable disc. A position sensor measured the disc axial location and a closed loop servo system maintained the shaft in the desired axial location. The entire magnetic field between the disc and the solenoids was generated by electric currents in the solenoid coils. Further, a large bias current was normally applied to the coils to generate a magnetic field and to linearize the relationship between input current and force produced on the disc. This method simplified the design of the servo controls.

There were several disadvantages of this early approach. First, very large electromagnet coils were required because of the requirement to generate and maintain continuously the entire magnetic field in the air gaps. Secondly, large amounts of input electrical power were required to maintain the magnetic fields, which resulted in a large electronics control system. Thirdly, two power amplifiers were required to develop bi-directional forces since the electromagnets were only capable of producing attraction forces.

Many of these disadvantages have been overcome by incorporating permanent magnets into thrust bearings. Newer types of magnetic thrust bearings utilize a radially polarized permanent magnet disc which forms an integral part of the rotatable disc. Two solenoids disposed about the thrust disc in facing relation on opposite sides thereof are utilized as before. This improved design has the advantages of linearizing the force versus solenoid control current, greatly reducing the required electrical power to develop forces on the disc, and reducing the size of the solenoids because the electromagnet coils must only provide control magnetic fields, not the primary magnetic field.

This improved approach, however, continues to suffer significant drawbacks. Most particularly, high shaft speeds produce centrifugal loads that can over-stress the magnets and thrust disc rings. This has effectively limited use of the improved-design magnetic thrust bearings in applications where high shaft speeds are encountered.

Accordingly, there has been a need for a novel magnetic thrust bearing which utilizes a combination of constant flux permanent magnets and controllable electromagnets for coupling a rotatable member relative to a stationary member, in a compact and spacially efficient structure which is lightweight and obtains a high power efficiency. Additionally, there exists a need for a magnetic thrust bearing wherein magnetic efficiency of the device is optimized by minimizing air gaps between the levitated and support structures, and wherein the electromagnetic coils are not required to provide magnetomotive forces to drive magnetic flux through the permanent magnets. Moreover, a novel magnetic thrust bearing is needed which can utilize radially polarized permanent magnets, and associates such magnets with the stationary member. The present invention fulfills these needs and provides other related advantages.

SUMMARY OF THE INVENTION

The present invention resides in an improved electromagnetic thrust bearing for axially flux coupling a rotatable member relative to a stationary member. The electromagnetic thrust bearing comprises, generally, thrust disc means fixed to and extending radially from the rotatable member, and means associated with the stationary member for generating a constant flux high density magnetic field linking the thrust disc to the stationary member. Means associated with the stationary member are also provided for generating a controllable electromagnetic field linking the thrust disc to the stationary member. The constant flux magnetic field generating means and the controllable electromagnetic field generating means cooperatively axially position the rotatable member relative to the stationary member. The arrangement of the electromagnetic thrust bearing of the present invention utilizes a unique combinations of permanent magnets and electromagnets in systems requiring only one amplifier. Further, the drawbacks of prior designs have been eliminated since the present design accommodates the use of arcuate permanent magnets placed on a stationary housing rather than on a portion of the rotatable member.

In its basic form, the electromagnetic thrust bearing of the present invention generates a high density magnetic flux directed through a minimum number of air gaps between the rotatable member and the stationary member. This provides a generally uniform magnetic field surrounding a portion of the rotatable member which, under perfect conditions, could theoretically suspend or levitate the rotatable member axially with respect to the stationary member. Such perfect conditions rarely exist, and certainly do not persist in an operating environment, and thus any axial displacement of the rotatable member relative to the stationary member will cause the rotatable member to be axially drawn into contact with a portion of the stationary member. This is known as the "negative spring" effect created by a constant magnetic field.

In order to counteract the "negative spring" effect, the present invention utilizes a controllable, variable flux electromagnetic field in connection with the thrust bearing to stabilize the rotatable member in an optimum axially centered position relative to the stationary member. Variations in the positioning of the rotatable member are neutralized by an active electromagnetic servo control system which produces a "positive spring" effect, that is, a high stiffness restoring force. The present invention utilizes a sensor which is positioned to detect axial displacement of the rotatable member relative to the stationary member. A servo control circuit, receiving input from the sensor, can correct for any axial displacement of the levitated member by controlling the electromagnetic field forces. In this way, signals from the position sensor enable the servo control system to stabilize the rotatable member and maintain it in an optimal axially centered position.

In one preferred form of the invention, the electromagnetic thrust bearing, which axially flux couples the rotatable member to the stationary member, utilized a pair of axially spaced apart thrust discs which extend radially outwardly from the body of the rotatable member. First and second means for generating an axially polarized, controllable electromagnetic field are associated with the stationary member and disposed between the pair of axially spaced apart thrust discs. The first and second electromagnetic field generating means include a pair of solenoids disposed about the rotatable member in oppositely facing relation to axially-facing sides of the pair of thrust discs. Each solenoid has an electromagnetic coil situated within a ferromagnetic housing which circumscribes a portion of the rotatable member.

Means for generating a constant flux, high density magnetic field is associated with the stationary member and disposed between the solenoids. The constant flux magnetic field generating means includes an arcuate, radially polarized permanent magnet.

In another preferred form of the invention, the electromagnetic thrust bearing utilizes a single thrust disc which extends radially outwardly from the body of the rotatable member. First means for generating an axially polarized, controllable electromagnetic field is associated with the stationary member and disposed adjacent to a first side of the thrust disc. The first electromagnetic field generating means includes a first solenoid having a first electromagnetic coil situated within a first ferromagnetic housing which circumscribes a portion of the rotatable member. Second means for generating an axially polarized, controllable electromagnetic field is associated with the stationary member and disposed adjacent to a second side of the thrust disc. The second electromagnetic field generating means includes a second solenoid having a second electromagnetic coil situated within a second ferromagnetic housing which circumscribes a portion of the rotatable member.

Means for generating a constant flux, high density magnetic field is associated with the stationary member and disposed between the solenoids and radially outwardly from the thrust disc. The constant flux magnetic field generating means includes an arcuate, radially polarized permanent magnet.

In both embodiments, means are provided for directing substantially all magnetic flux from the first and second electromagnetic field generating means and the constant flux magnetic field generating means, axially between the thrust disc(s) and the stationary member. This magnetically links the thrust disc(s) to the solenoids and provides a magnetic flux path for the electromagnetically generated flux around the permanent magnets and the electromagnetic coils, and provides controlled magnetic flux coupling of the rotatable member to the stationary member.

A position sensor situated adjacent to a portion of the rotatable member provides means for determining the axial position of the rotatable member relative to the stationary member. A servo control system provides means for controlling the axial positioning of the thrust disc(s) by varying the magnetic flux generated by the first and second electromagnetic field generating means. More specifically, the electromagnetic coils of the solenoids are controlled through the servo control system in order to provide the desired amount of electromagnetic flux and to thereby control the electromagnetic field surrounding the thrust disc(s). The construction of the electromagnetic thrust bearings of the present invention permits the flux generated by the electromagnetic coils to be varied in order to obtain optimum positioning of the rotatable member, without requiring the controllable, variable magnetomotive force to drive flux through a permanent magnet. In this manner, the structure maintains a high degree of power efficiency.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
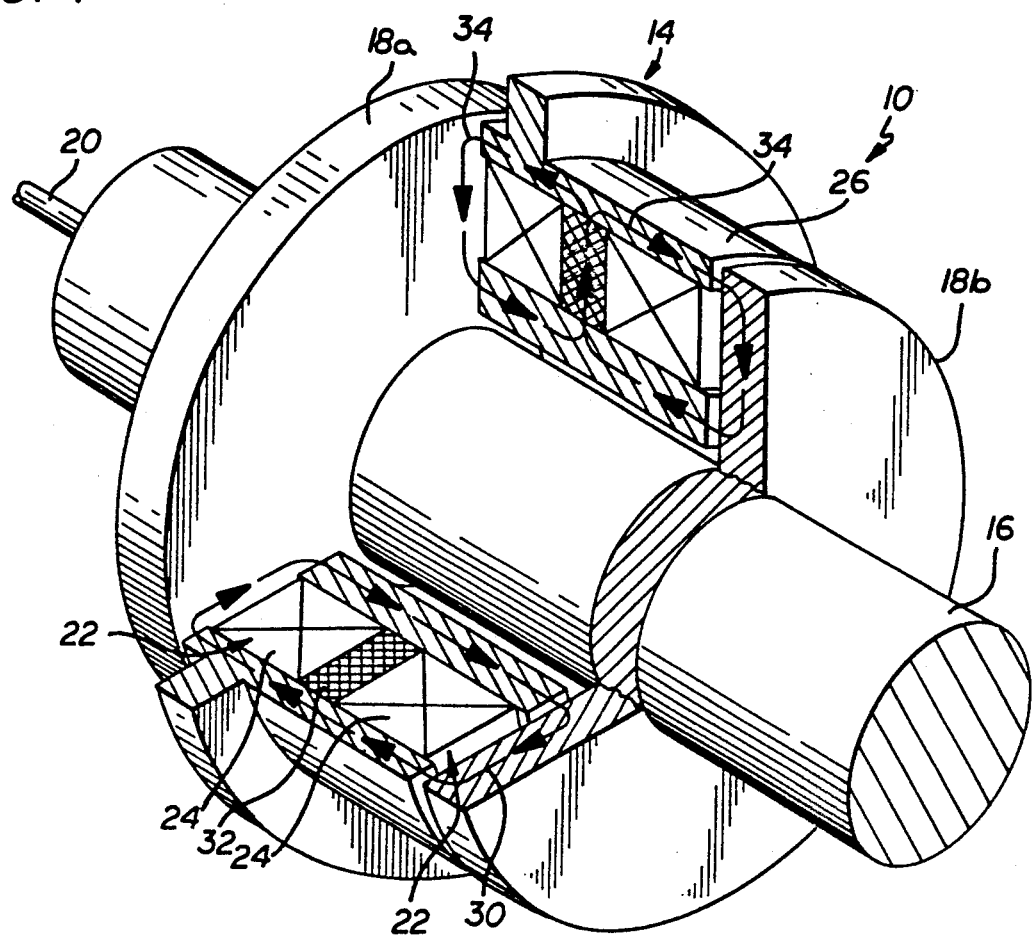
FIG. 1 is a partially sectional perspective view of an electromagnetic thrust bearing embodying the invention, illustrating the use of two solenoids in relation to a pair of axially spaced apart thrust discs, to provide means associated with the stationary member for generating a controllable electromagnetic field linking the thrust discs to the stationary member, and a radially polarized permanent magnet disposed between the solenoids which provides means for generating a constant flux high intensity magnetic field also linking the thrust disc to the stationary member.

As shown in the drawings for purposes of illustration, the present invention is concerned with an improved electromagnetic thrust bearing, the two illustrated embodiments being generally designated in the accompanying drawings by the reference numbers 10 and 12, respectively. The thrust bearings 10 and 12 comprise a stationary outer housing 14 and a cylindrical rotatable shaft 16 which extends axially through the housing 14. In the thrust bearing 10, the shaft 16 includes a pair of axially spaced apart, radially extending thrust discs 18a and 18b which are at least partially enveloped by portions of the stationary outer housing 14. The shaft 16' of the thrust bearing 12, on the other hand, includes a single radially extending thrust disc 18' which is generally enveloped by portions of the stationary outer housing 14'. The electromagnetic thrust bearings 10 and 12 generate a high density controllable magnetic field between the housing 14 and the thrust disc(s) 18, to axially flux couple the shaft 16 to the housing 14, and are controlled by a one-axis servo control system. Only one position sensor 20 need be associated with the thrust bearings 10 and 12 to detect and compensate for axial displacement of the shaft 16 relative to the housing 14.

For purposes of better understanding two illustrated embodiments of the electromagnetic thrust bearing of the present invention, like elements between both embodiments will be given the same reference number, differentiated by the prime symbol (') in the second embodiment shown in FIGS. 3 and 4.

Figure 2:
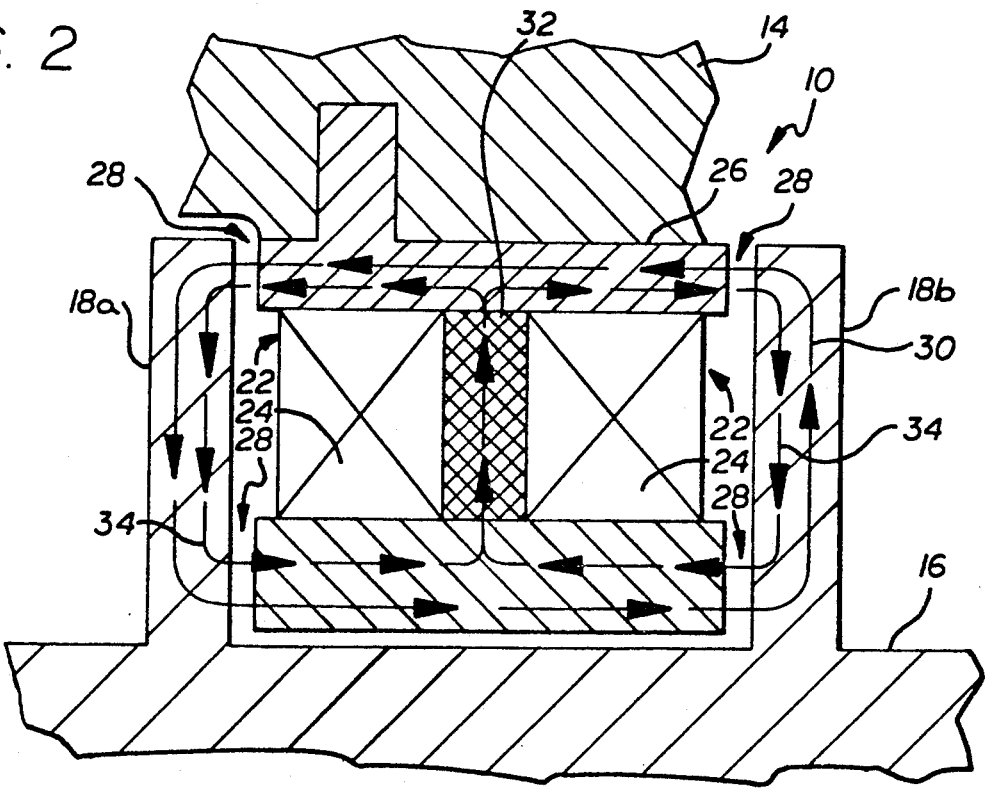
FIG. 2 is an enlarged fragmented sectional elevational view of the magnetic thrust bearing illustrated in FIG. 1, showing exemplary magnetic flux paths generated by the radially polarized permanent magnet and the controllable solenoids.

In accordance with the present invention, and as illustrated in FIGS. 1 and 2 with respect to the electromagnetic thrust bearing 10, the stationary outer housing 14 supports a pair of solenoids 22 which are disposed about the shaft 16 in oppositely facing relation to axially-facing sides of the thrust discs 18a and 18b. Each solenoid 22 includes a controllable electromagnetic coil 24 situated within a ferromagnetic coil housing 26. As shown, the electromagnetic coils 24 share a common coil housing 26. The coil housing 26 interfaces with the thrust discs 18a and 18b with very small air gaps 28 of approximately 0.007 inch. The electromagnetic coils 24 are connected so that the solenoids 22 operate in concert to develop additive forces on the thrust discs 18a and 18b, as shown by the flux arrows 30.

Disposed between the electromagnetic coils 24 and within the coil housing 26 is an arcuate, radially polarized permanent magnet 32. The radially polarized permanent magnet 32 is arranged so as to generate axially flowing magnetic fields in the air gaps 28 between the coil housing 26 and the rotating thrust discs 18a and 18b as shown by the flux path arrows 34. The permanent magnet 32, which generates a constant flux high density magnetic field generally surrounding a portion of the shaft 16, provides the primary flux coupling of the housing 14 (and specifically the coil housing 26) to the shaft 16 (specifically the thrust discs 18a and 18b).

Figure 3:
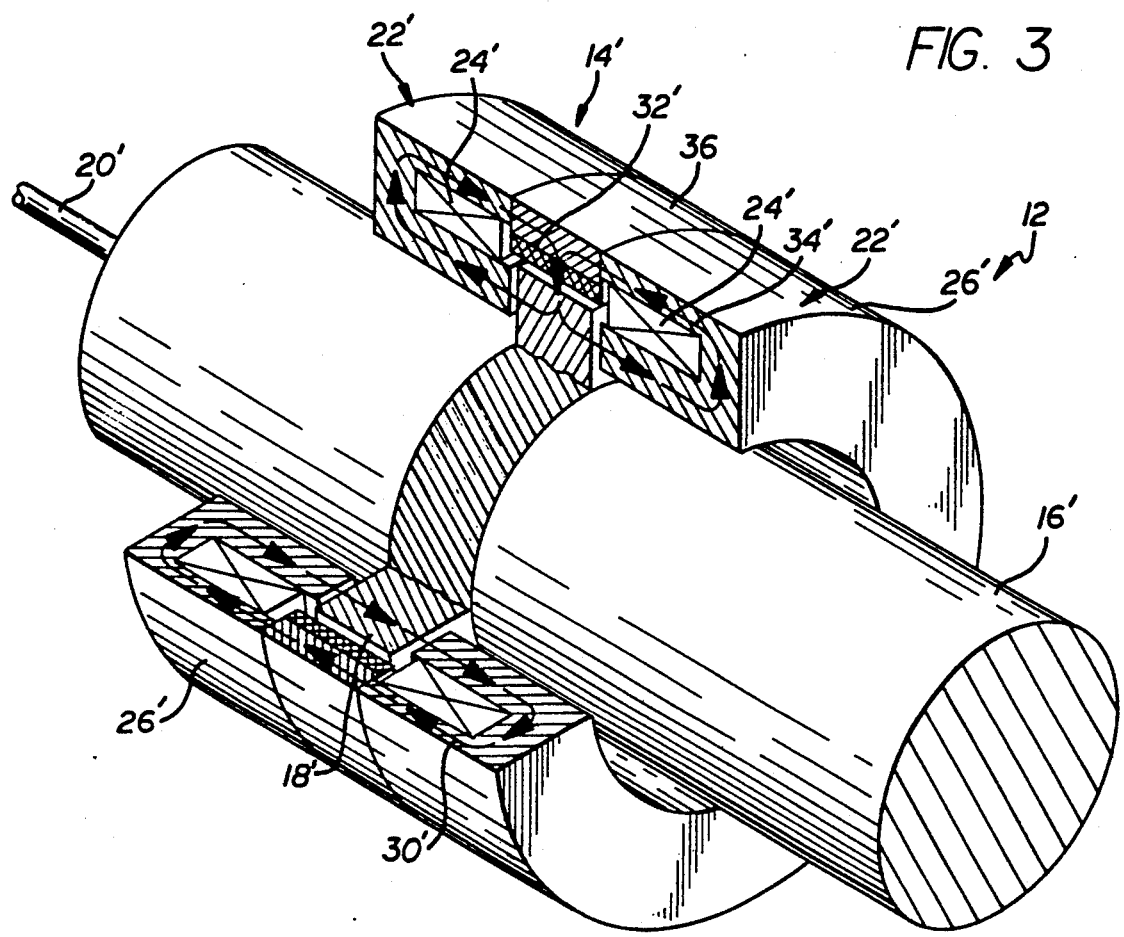
FIG. 3 is a partially sectional perspective view of another electromagnetic thrust bearing embodying the invention, illustrating the use of two solenoids in relation to a single thrust disc to provide means associated with the stationary member for generating a controllable electromagnetic field linking the thrust disc to the stationary member, and a radially polarized permanent magnet disposed between the solenoids and radially outwardly from the thrust disc, which provides means for generating a constant flux high density magnetic field also linking the thrust disc to the stationary member.
Figure 4:
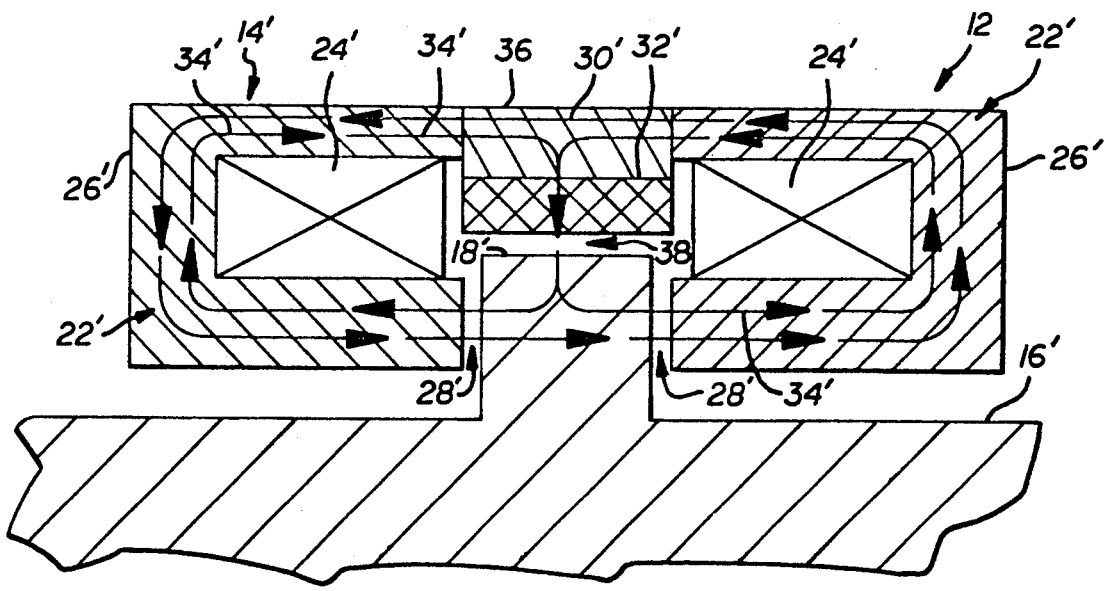
FIG. 4 is an enlarged fragmented sectional elevational view of the magnetic thrust bearing illustrated in FIG. 3, showing exemplary magnetic flux paths generated by the radially polarized permanent magnet and the controllable solenoids.

With respect now to the second illustrated embodiment of the electromagnetic thrust bearing 12 shown in FIGS. 3 and 4, the stationary outer housing 14' supports a pair of solenoids 22' which are disposed about the shaft 16' in oppositely facing relation to axially-facing sides of the thrust disc 18'. Each solenoid 22' includes a controllable electromagnetic coil 24' situated within a ferromagnetic coil housing 26'. The coil housings 26' generally surround the thrust disc 18' with very small air gaps 28' of approximately 0.007 inch. The electromagnetic coils 24' are connected so that the solenoids 22' operate in concert to develop additive forces on the thrust disc 18', as shown by the flux arrows 30'.

Associated with the housing 14' is an arcuate, radially polarized permanent magnet 32' which is disposed between the electromagnetic coils 24' and radially outwardly from the thrust disc 18'. The permanent magnet 32' is linked magnetically to the coil housings 26' by a ferromagnetic pole piece 36. The radially polarized permanent magnet 32' is arranged so as to generate axially flowing magnetic fields in the air gaps 28' between the coil housings 26' and the rotating thrust disc 18' as shown by the flux path arrows 34'. The permanent magnet 32' also generates a radially flowing magnetic field in an air gap 38 between the permanent magnet 32' and the facing surface of the thrust disc 18'. The permanent magnet 32', which generates a constant flux, high density magnetic field generally surrounding a portion of the shaft 16', provides the primary flux coupling of the housing 14' to the shaft 16'.

With the foregoing basic construction of the electromagnetic thrust bearings 10 and 12 in mind, their function will be described in greater detail. The permanent magnets 32 and 32' generate magnetic fields having magnetic flux paths illustrated by the arrows having the reference numbers 34 and 34'. The permanent magnets 32 and 32' generate a relatively constant, high density magnetic flux.

In the embodiment illustrated in FIGS. 1 and 2, this permanent magnet flux 34 is conducted through a portion of the coil housing 26 axially from the permanent magnet 32, and extends across the air gaps 28 to adjacent portions of the thrust discs 18a and 18b. Within the thrust discs 18a and 18b, the flux 34 is redirected radially and then axially once again across the air gaps 28 toward the permanent magnet 32 itself. It will be noted that the magnetic flux 34 generated by the radially polarized permanent magnet 32 is directed axially through only two air gaps 28 between the thrust discs 18a and 18b and the ferromagnetic coil housing 26 to provide magnetic flux coupling of the shaft 16 to the housing 14.

With reference to the second illustrated embodiment of the electromagnetic thrust bearing 12 shown in FIGS. 3 and 4, the permanent magnet 32' generates magnetic fields having magnetic flux paths illustrated by the arrows having the reference number 34'. The permanent magnet 32' generates the relatively constant, high density magnetic flux which is conducted radially across the air gap 38 to the thrust disc 18', where it is redirected to extend axially across the air gaps 28' to adjacent portions of the ferromagnetic coil housings 26'. This flux 34' extends through the coil housings 26', around the electromagnetic coils and into the pole piece 36, where the flux is again redirected radially toward the permanent magnet 32' itself. In contrast with the embodiment of FIGS. 1 and 2, the electromagnetic thrust bearing 12' shown in FIGS. 3 and 4 includes a radial air gap between the thrust disc 18' and the permanent magnet 34'.

In each embodiment, under perfect conditions and assuming no radial or moment loading upon the shafts 16 and 16', if the shafts were to be precisely centered so that uniform air gaps 28 and 28' existed completely around the thrust discs 18a, 18b and 18', then, theoretically, the high density magnetic fields produced by the permanent magnets 32 and 32' would create an axially directed force system which was metastable. However, any eccentricity of the shafts 14 and 14' will cause the thrust discs 16 and 16' to be drawn toward one of the solenoids 22 and 22'. This is the so-called "negative spring" effect of the constant magnetic field provided by the permanent magnets 32 and 32'.

The active control electromagnetic coils 24 and 24' positioned about the shaft 16 and 16' within the coil housings 26 and 26' are controlled by a servo circuit to counteract the "negative spring" effect and produce a "positive spring," that is, a high stiffness restoring force which keeps the thrust discs 18 and 18' centered between the solenoids 20 and 20'. The reference numbers 30 and 30' identify exemplary magnetic flux paths of flux generated by the active control electromagnetic coils 24 and 24'. Each of the electromagnetic coils 24 and 24' is capable of generating an axially polarized, controllable electromagnetic field, wherein the flux path 30 and 30' is directed across the air gaps 28 and 28' and conducted peripherally around the electromagnetic coils 24 and 24' and the permanent magnets 32 and 32'.

In use, the radially polarized, constant flux magnetic fields generated by the permanent magnets 32 and 32', tend to cause the thrust discs 18 and 18' to displace from a true centered position between the solenoids 22 and 22' and into engagement with one solenoid or the other. Such displacement is sensed by the Z-axis position sensors 20 or 20' which provides input to a servo circuit. An exemplary servo circuit is described in U.S. Pat. No. 5,111,102. The servo circuit selectively controls electrical current to the active control electromagnetic coils 24 and 24' in order to provide a positive gradient which keeps the thrust discs 18 and 18' in a true centered position. The greater the displacement of the shaft 16 or 16', the greater the restoring force generated by the use of the servo circuit and the electromagnetic coils 24 or 24'. Thus, a high density magnetic field is produced through the air gaps 28 and 28', which produces an axial force system which is metastable when the thrust discs 16 and 16' are centered between the solenoids 22 and 22'.

Energizing the paired electromagnetic coils 24 or 24' results in an electromagnetic flux 30 or 30' that produces changes in the total magnetic flux in the air gaps 28 or 28' surrounding the thrust discs 18 or 18'. The changes add to or reduce the magnetic fields generated by the permanent magnets 32 or 32' in the associated air gaps 28 or 28'. Consequently, controllable magnetomotive forces are produced by modulating the current in the electromagnetic coils 24 or 24'.

The electromagnetic thrust bearings 10 and 12 are designed so that the electromagnetic flux 30 and 30' generated by the electromagnetic coils 24 and 24' take a different path than the permanent magnet flux 34 and 34' generated by the permanent magnets 32 and 32'. This greatly improves the electrical efficiency of the thrust bearings 10 and 12 because the electromagnetic coils 24 and 24' do not have to drive magnetic flux through the permanent magnets 32 and 32', which have a very high resistance to conducted magnetic fields.

From the foregoing it is to be appreciated that the improved electromagnetic thrust bearings 10 and 12 of the present invention are capable of providing controlled thrust load support of the shafts 14 and 14' relative to the housings 12 and 12'. The disclosed thrust bearings 10 and 12 produce a compact and spacially efficient system which requires only one amplifier for controlling the electromagnetic coils 24 or 24', thus minimizing control electronics associated with the electromagnetic thrust bearings 10 and 12. Further, the thrust bearings 10 and 12 of the present invention overcome drawbacks noted in connection with prior designs in that permanent magnets are utilized in connection with controllable electromagnetic coils to increase the power efficiency of the structure. Moreover, the association of the permanent magnets 32 and 32' with the stationary housing 14 and 14' avoids over-stressing of the thrust discs 18 and 18' as well as the permanent magnets themselves at high speeds due to centrifugal loads.

Although two particular embodiments of the invention have been described in detail for purposes of illustration, various modifications may be made without departing from the spirit and scope of the invention. Accordingly, the invention is not to be limited, except as by the appended claims.

We claim:

1. An electromagnetic thrust bearing for coupling a rotatable member relative to a stationary member, the thrust bearing comprising:

thrust disc means fixed to and extending radially from the rotatable member;

an arcuate permanent magnet associated with the stationary member, for generating a constant flux high density magnetic field linking the thrust disc means to the stationary member; and a pair of solenoids associated with the stationary member and disposed about the rotatable member in oppositely facing relation to axially-facing sides of the thrust disc means, for generating a controllable electromagnetic field linking the thrust disc means to the stationary member;

wherein the permanent magnet and the solenoids cooperatively axially position the rotatable member relative to the stationary member.

2. An electromagnetic thrust bearing as set forth in claim 1, wherein each solenoid includes a controllable electromagnetic coil situated within a ferromagnetic housing which circumscribes a portion of the rotatable member.

3. An electromagnetic thrust bearing as set forth in claim 1, wherein the solenoids are axially aligned with one another and cooperatively generate a controllable, axially polarized electromagnetic field to magnetically link the thrust disc means to the solenoids and provide a magnetic flux path for electromagnetically generated flux around the permanent magnet and the electromagnetic coils.

4. An electromagnetic thrust bearing as set forth in claim 1, wherein the permanent magnet is radially polarized.

5. An electromagnetic thrust bearing as set forth in claim 1, wherein the permanent magnet is disposed between the pair of solenoids.

6. An electromagnetic thrust bearing as set forth in claim 1, including sensor means for determining axial positioning of the rotatable member relative to the stationary member, and for controlling the positioning of the thrust disc means by varying the magnetic flux generated by the solenoids.

7. An electromagnetic thrust bearing as set forth in claim 1, wherein the thrust disc means includes a pair of axially spaced apart thrust discs, and wherein the pair of solenoids are disposed between the axially spaced apart thrust discs.

8. An electromagnetic thrust bearing as set forth in claim 7, wherein the permanent magnet is disposed between the pair of solenoids and is radially polarized.

9. An electromagnetic thrust bearing as set forth in claim 1, wherein the thrust disc means comprises a single thrust disc, and wherein the pair of solenoids are disposed about the rotatable member in facing relation on opposite axially-facing sides of the thrust disc.

10. An electromagnetic thrust bearing as set forth in claim 9, wherein the permanent magnet is disposed radially outwardly from the thrust disc.

11. An electromagnetic thrust bearing for axially flux coupling a rotatable member relative to a stationary member, the thrust bearing comprising:

thrust disc means fixed to and extending radially from the rotatable member, the thrust disc means having first and second opposite, axially facing, sides;

first means associated with the stationary member and adjacent to the first side of the thrust disc means, for generating an axially polarized, controllable electromagnetic field;

second means associated with the stationary member and adjacent to the second side of the thrust disc means, for generating an axially polarized, controllable electromagnetic field;

means associated with the stationary member and disposed between the first and second electromagnetic field generating means, for generating a constant flux, high density magnetic field; and means for directing substantially all magnetic flux from the first and second electromagnetic field generating means and the constant flux magnetic field generating means, axially between the thrust disc means and the stationary member, to provide controlled magnetic flux coupling of the rotatable member to the stationary member.

12. An electromagnetic thrust bearing as set forth in claim 11, wherein the constant flux magnetic field generating means includes a radially polarized, arcuate permanent magnet.

13. An electromagnetic thrust bearing as set forth in claim 12, wherein the first and second means for generating an axially polarized, controllable electromagnetic field each include an electromagnetic coil circumferentially positioned about the rotatable member and axially spaced from the thrust disc means.

14. An electromagnetic thrust bearing as set forth in claim 13, wherein the electromagnetic coils are axially aligned with the permanent magnet.

15. An electromagnetic thrust bearing as set forth in claim 13, wherein the stationary member includes spaced apart, facing first and second coil housings which circumferentially surround a portion of the rotatable member and wherein the thrust disc means is situated between the facing coil housings.

16. An electromagnetic thrust bearing as set forth in claim 15, wherein the electromagnetic coils are axially aligned with one another and cooperatively generate a controllable, axially polarized electromagnetic field to magnetically link the thrust disc means to the facing coil housings, wherein a magnetic flux path is provided for electromagnetically generated flux around the permanent magnet and the electromagnetic coils.

17. An electromagnetic thrust bearing as set forth in claim 16, wherein the permanent magnet is disposed radially relative to the thrust disc means.

18. An electromagnetic thrust bearing as set forth in claim 14, wherein the thrust disc means comprises a pair of axially spaced apart thrust discs, and wherein the electromagnetic coils are disposed therebetween.

19. An electromagnetic thrust bearing as set forth in claim 11, including means for determining axial positioning of the rotatable member relative to the stationary member, and for controlling axial positioning of the thrust disc means by varying the magnetic flux generated by the first and second electromagnetic field generating means.

20. An electromagnetic thrust bearing for coupling a rotatable member relative to a stationary member, the thrust bearing comprising:

a pair of axially spaced apart thrust discs fixed to and extending radially from the rotatable member;

means associated with the stationary member, for generating a constant flux high density magnetic field linking the thrust discs to the stationary member; and means associated with the stationary member and disposed between the axially spaced apart thrust discs, for generating a controllable electromagnetic field linking the thrust discs to the stationary member;

wherein the constant flux magnetic field generating means and the controllable electromagnetic field generating means cooperatively axially position the rotatable member relative to the stationary member.

21. An electromagnetic thrust bearing as set forth in claim 20, wherein the constant flux magnetic field generating means is linked magnetically to the thrust discs through two air gaps such that axially directed flux from the constant flux magnetic field generating means passes through the air gaps to create a high density magnetic field linking the rotatable member to the stationary member.

22. An electromagnetic thrust bearing as set forth in claim 20, wherein the electromagnetic field generating means includes a pair of solenoids disposed about the rotatable member between the thrust discs.

23. An electromagnetic thrust bearing as set forth in claim 20, wherein each solenoid includes a controllable electromagnetic coil situated within a ferromagnetic housing which circumscribes a portion of the rotatable member.

24. An electromagnetic thrust bearing as set forth in claim 23, wherein the solenoids are axially aligned with one another and cooperatively generate a controllable, axially polarized, electromagnetic field to magnetically link the thrust discs to the solenoids and provide a magnetic flux path for electromagnetically generated flux around the constant flux magnetic field generating means and the electromagnetic coils.

25. An electromagnetic thrust bearing as set forth in claim 21, wherein the constant flux magnetic field generating means includes an arcuately shaped permanent magnet disposed between the axially spaced apart thrust discs.

26. An electromagnetic thrust bearing as set forth in claim 25, wherein the permanent magnet is radially polarized.

27. An electromagnetic thrust bearing as set forth in claim 22, wherein the constant flux magnetic field generating means includes an arcuately shaped permanent magnet disposed between the axially spaced apart thrust discs, wherein the permanent magnet is further disposed between the pair of solenoids.

28. An electromagnetic thrust bearing as set forth in claim 20, including sensor means for determining axial positioning of the rotatable member relative to the stationary member, and for controlling positioning of the thrust discs by varying the magnetic flux generated by the controllable electromagnetic field generating means.

* * * * *